Dec. 23, 1941.  F. DÖRING  2,267,193
SELECTOR SWITCH
Filed Oct. 25, 1939

INVENTOR
FRITZ DORING
BY
ATTORNEY

Patented Dec. 23, 1941

2,267,193

UNITED STATES PATENT OFFICE 2,267,193

SELECTOR SWITCH

Fritz Döring, Berlin, Germany, assignor to Fides Gesellschaft für die Verwaltung und Verwertung von gewerblichen Schutzrechten mit beschrankter Haftung, Berlin, Germany, a corporation of Germany Application October 25, 1939, Serial No. 301,251
In Germany October 25, 1938

2 Claims. (Cl. 200—171)

The invention relates to a wiper carriage for selectors, more particularly to selectors of the rod type, the wipers of which perform a rectilinear movement in front of a plane contact bank, the wiper carriage being to this end carried for lengthwise movement by a stationary rod or the like element, upon which it performs a step-by-step or sliding movement when operated.

A selector switch of the type referred to and in which a wiper carriage of this type may be used is shown in United States Patent #1,450,352, issued April 3, 1923.

The invention provides a wiper carriage construction presenting special features and characterised by its small weight. To this end the carriage for the wipers is constituted by a Bakelite (artificial resin) moulding which is provided with apertures for the attachment of the wipers and with projections for supporting them. The attachment and support of the wipers on their carriage is thereby greatly simplified and, at the same time the weight of the carriage is reduced. The wipers consist preferably of sheet metal strips which are bent into U-shape, and are passed through the apertures of the carriage and the two ends of which constitute the contact points co-operating with the stationary contacts of the contact bank. The side faces of the projections of the carriage provided at the bearing points of the wipers contact with the inner faces of the wipers and thus constitute a backing for the same. According to a further feature of the invention the rack which provides for the upward movement of the carriage consists likewise of artificial resin and constitutes, with the carriage, one integral member, whereby the weight of the wiper carriage is still further reduced and its manufacture simplified.

Figure 1:
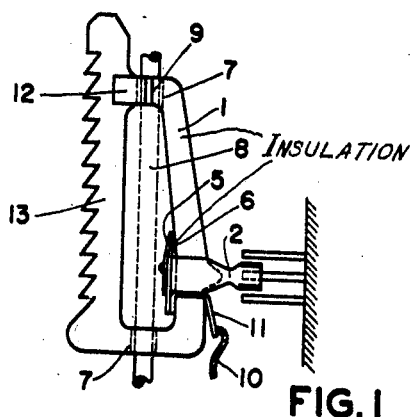
Figure 2:
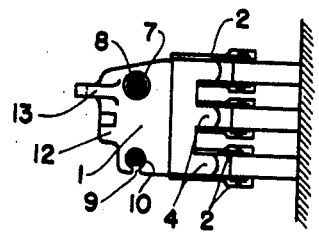
Figure 3:
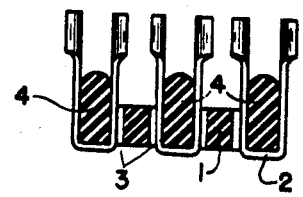

In the drawing which illustrates, by way of example, an embodiment of the invention on an increased scale, Fig. 1 is a side view of the wiper carriage according to the invention, Fig. 2 is a plan view thereof, Fig. 3 is a substantially enlarged cross-section of the wiper carriage taken at the bearing point of the wipers.

The member 1 is moulded or die-cast of artificial resin (Bakelite) and is provided at the bearing points of the wipers 2 with slot-shaped apertures 3 through which the one end or both ends of sheet metal strips are extended which are bent into U-shape and constitute the wipers 2. For the support of the wipers 2 the body 1 is provided with a projection 4 between the bearing points of each of the wipers, intermediate both ends thereof, which projection bears with its two outside faces against the inner face of the wipers. The wipers are secured to the insulating body 1 and held in place in slots 3 by a plate 5 arranged upon an insulating layer 6 behind the bearing points of the wipers as shown in Fig. 1. This plate is rigidly attached to the carriage body 1 by a screw or the like as indicated, being at the same time used for keeping the conductor blades 11 of the wipers in contact therewith.

At its upper and lower bearing portions the wiper carriage is furthermore provided with apertures 7 for the passage of the selector shaft 8 shown in dotted lines and, at the upper bearing portion, with a recess 9 which is for the guidance of the usual movable current conductors which are connected to the conductor blades, 11. For convenience such conductors are only generally illustrated at 10 in Figs. 1 and 2. At the upper portion of the wiper carriage 1 a projection 12 is provided which is used for the control of off normal contact springs during the operation of the selector switch.

In the embodiment illustrated in the drawing the rack 13 containing ratchet teeth which may be engaged by the usual pawl for the adjustment of the wiper support 1 consists of the same material as the wiper support with which it forms one integrally manufactured member. The mass of the carriage and, at the same time, the costs of its manufacture are thereby reduced, it being, however, understood, that the scope of the patent is not to be limited to the embodiment shown and that the rack may also be of metal and be a separate part rigidly connected with the wiper carriage.

I claim:

1. A wiper carriage for the wipers of an automatic switch comprising a unit molded in one piece of insulating material, said unit comprising an upright section having ratchet teeth molded in one edge thereof, a second upright section joined to the first section by upper and lower horizontal sections having bearing holes therein, slots through said second section, a series of U-shaped wipers supported in said slots and a plate secured to said second section and covering the bases of said wipers to hold them in said slots.

2. A wiper support for an automatic selector switch comprising a unit molded from insulating material, said unit comprising an upright section having ratchet teeth along one edge thereof, another upright section joined to said first section at its upper and lower ends by horizontal sections, said second section having slots supporting the wipers, said horizontal sections having bearing holes therethrough for the shaft of the selector switch.

FRITZ DÖRING.